No. 881,826. PATENTED MAR. 10, 1908.
H. J. RABONE.
FLEXIBLE STEEL OR METAL MEASURING TAPE.
APPLICATION FILED JULY 2, 1907.
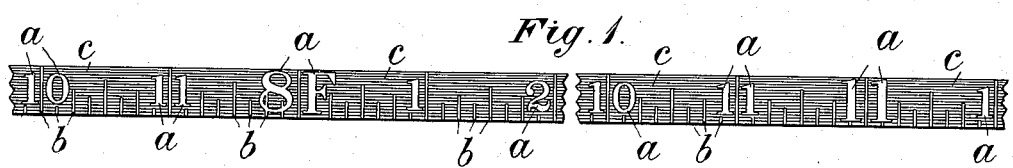
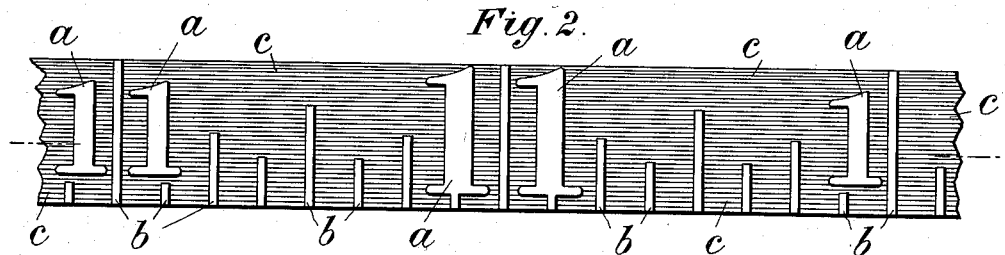
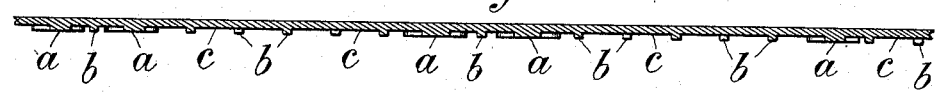
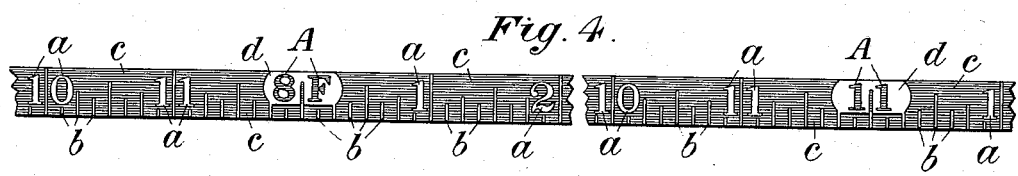
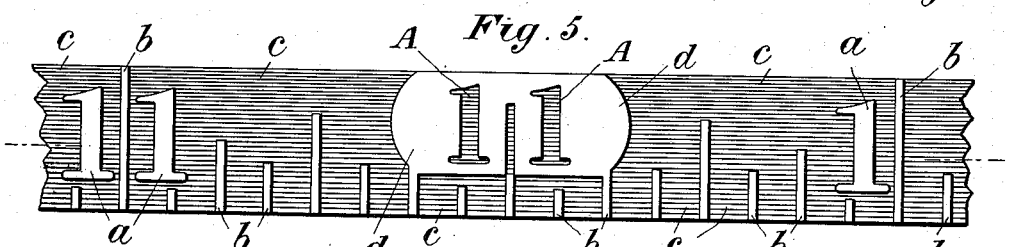
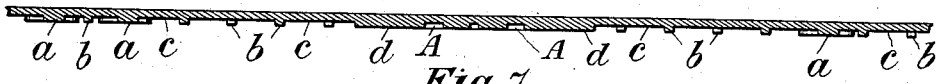
Witnesses:—
Richard Skerrett
Arthur John Powell
Inventor;
Harry Josere Rabone

UNITED STATES PATENT OFFICE.

HARRY JOSEPH RABONE, OF BIRMINGHAM, ENGLAND.

FLEXIBLE STEEL OR METAL MEASURING-TAPE.

No. 881,826.     Specification of Letters Patent.     Patented March 10, 1908.

Application filed July 2, 1907. Serial No. 381,890.

*To all whom it may concern:*

Be it known that I, HARRY JOSEPH RABONE, a subject of the King of Great Britain, residing at Hockley Abbey Works, Whitmore street, Birmingham, England, have invented certain new and useful Improvements in Flexible Steel or Metal Measuring-Tapes, of which the following is a specification.

My invention consists of the improvements hereinafter described in flexible steel or metal measuring tapes principally used in winding tape measures, whereby the ready and accurate reading off of the main divisions of the tape measure are secured and the ordinary wear of the tape measure does not affect, or affects to a slight extent the legibility of the main divisions of the tape measure.

In ordinary flexible steel or metal measuring tapes the numerals, marks or divisions are produced in relief by the etching of the ground, the numerals, marks or divisions being bright on a dull or matte surface. In order to enable the user to readily read off the main divisions of the ordinary tape measure such as feet, yards, meters and other main divisions, they have been usually marked in a larger or smaller type than the sub or minor divisions such as inches, centimeters and the like, and this difference in type is the only distinction between the main and sub-divisions. In other kinds of tape measures the whole of the divisions of the tape measure have been marked by the etching of the figures, the resulting figures being thereby sunken in a bright ground.

According to my invention I combine in the same flexible tape measure the two types of figures and marks hereinbefore referred to; that is to say, I etch in the flexible tape measure the main divisions such as feet, yards, meters and other main divisions and produce the said sunken or etched main divisions on plain or bright tablets, the said plain or bright tablets and the sub or minor divisions such as inches, decimals or other minor divisions being produced by etching the main part of the tape measure which leaves the said tablets and sub or minor divisions and their figures bright and in relief on a dull or matte surface.

In order that the said invention may be the better understood I have represented in Figure 1 of the accompanying drawing an elevation of portions of an ordinary flexible steel tape measure and in Figs. 2 and 3 I have represented in elevation and longitudinal section respectively a part of the said measure drawn to a larger scale than Fig. 1, the raised parts in Fig. 3 being exaggerated. In Figs. 4, 5 and 6 I have represented similar views of a flexible steel tape measure provided with the improvements constituting my invention, and in Fig. 7 I have represented a modification of my improved flexible steel tape measure.

By an examination of Figs. 1, 2 and 3 it will be seen that all the figures and letters marked $a$ of the main and sub-divisions as well as the lines marked $b$ of the said main and sub-divisions are produced in relief by the etching of the ground marked $c$, the said figures, letters and lines or divisions being bright on a dull or matte surface. As a consequence it will be noted, especially by reference to Fig. 2 that there is but little difference between the figures of the main divisions and the figures of the sub divisions and the reading of the tape measure is attended at times with considerable difficulty.

By an examination of Figs. 4, 5, 6 and 7 it will be seen that I have combined the well known form of marking flexible steel measuring tapes described and illustrated with reference to Figs. 1, 2 and 3 with another well known alternative form so as thereby to obtain say the figures and letters $a$ and lines or divisions $b$ of the sub-divisions bright and in relief on a dull or matte ground $c$ as in the ordinary tape measure hereinbefore described and illustrated and the figures and letters A and portions of the lines or divisions of the main divisions dull and sunken in bright and raised tablets $d$.

If thought necessary or desirable for the purpose of better distinguishing the figures, letters and lines of the main divisions the sunken figures, letters and lines on each bright and raised tablet $d$ may be filled with a colored enamel or other coloring matter.

Although I have represented the figures $a$ and lines $b$ of the sub-divisions in relief and the figures, letters and lines of the main divisions in intaglio yet I wish it to be understood that the said arrangement may be reversed if desired.

I do not limit myself to the shape of the bright and raised tablets $d$ represented in Figs. 4 and 5 as the same may be varied, for example, the said tablets $d$ may be of a diamond or lozenge shape as is represented in Fig. 7.

By the combination of types of main and sub-divisions in the tape measure hereinbefore described and illustrated in Figs. 4, 5, 6 and 7, its use is facilitated as the main divisions are very readily read off and the wearing of the tape measure does not affect, or affects only to a slight extent, the legibility of the sunken figures, letters and lines or division marks inclosed by the plain or bright tablets.

Having now described my invention what I claim as new and desire to secure by Letters Patent is,—

1. A flexible steel measuring tape having in the main a dead surface and the lines or division marks and figures of the subdivisions in relief, bright tablets being arranged at intervals throughout the length and formed as a part of the tape and provided with lines or division marks and figures or letters indicating the main divisions to distinguish the said main divisions from the marks, figures, and lines of the subdivisions, the tablets being of such thickness as to permit the tape to be regularly coiled.

2. A flexible steel measuring tape having in the main a dead surface and lines or division marks and figures of the subdivisions in relief, and raised tablets disposed at intervals throughout the length and formed as a part of the tape structure and having bright surfaces and provided with lines or division marks and figures or letters of the main divisions to distinguish the said main divisions from the lines or division marks and figures of the subdivisions, the tablets being of such thickness as to permit the regular coiling of the tape.

In testimony whereof I have hereunto set my hand in presence of two subscribing witnesses.

HARRY JOSEPH RABONE.

Witnesses:
 RICHARD SKERRETT,
 ARTHUR JOHN POWELL.